(12) United States Patent
Soderstrom et al.

(10) Patent No.: US 7,522,560 B2
(45) Date of Patent: Apr. 21, 2009

(54) METHOD, SYSTEM AND EQUIPMENT FOR RETRANSMISSION IN COMMUNICATIONS SYSTEMS

(75) Inventors: Raul Soderstrom, Kirkkonummi (FI); Janne Peisa, Espoo (FI); Toomas Wigell, Espoo (FI); Johan Torsner, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 920 days.

(21) Appl. No.: 10/471,233

(22) PCT Filed: Feb. 8, 2002

(86) PCT No.: PCT/SE02/00231

§ 371 (c)(1),
(2), (4) Date: Sep. 9, 2003

(87) PCT Pub. No.: WO02/065797

PCT Pub. Date: Aug. 22, 2002

(65) Prior Publication Data

US 2004/0146033 A1 Jul. 29, 2004

(30) Foreign Application Priority Data

Feb. 9, 2001 (SE) .................................. 0100475

(51) Int. Cl.
H04B 7/204 (2006.01)
(52) U.S. Cl. ........................ 370/332; 455/436
(58) Field of Classification Search ........... 370/465, 370/252, 254, 331; 455/400, 401, 402
See application file for complete search history.

(56) References Cited

U.S. PATENT DOCUMENTS 5,101,501 A * 3/1992 Gilhousen et al. ........... 455/442

(Continued)

FOREIGN PATENT DOCUMENTS

EP 0898438 2/1999

(Continued)

OTHER PUBLICATIONS

TSGR3#7(99)C23 Nokia' "Principles for Including the Uu Interface Related Information to Ranap Messages Used for Relocation of SRNS"; TSG-RAN Working Group Meeting #7, Sep. 1999.

Primary Examiner—Ricky Ngo
Assistant Examiner—Ben H Liu
(74) Attorney, Agent, or Firm—Nixon & Vanderhye P.C.

(57) ABSTRACT

By adaptively relocating a transmitting point between a base station and a base station controller, e.g., an RNC, optimal ARQ performance is achieved. The adaptation may be based on one or more of many factors such as the distance between a network element and a user equipment. As one example, for a mobile radio near a base station, the transmitting point where the ARQ protocol terminated in the radio network is located in that base station so that ARQ packet retransmissions are performed quickly. For a mobile radio in or about to be in soft handover, the transmitting point where the ARQ protocol terminated in the radio network is located in a base station controller coupled to the base stations involved in (or soon will be involved in) soft handover so that robust ARQ packet retransmissions are provided.

23 Claims, 5 Drawing Sheets

U.S. PATENT DOCUMENTS

| | | | | |
|---|---|---|---|---|
| 5,267,261 | A * | 11/1993 | Blakeney et al. | 370/332 |
| 5,671,219 | A * | 9/1997 | Jensen et al. | 370/280 |
| 5,787,346 | A * | 7/1998 | Iseyama | 455/439 |
| 5,970,435 | A * | 10/1999 | Ito | 702/173 |
| 6,208,620 | B1 * | 3/2001 | Sen et al. | 370/231 |
| 6,301,479 | B1 * | 10/2001 | Roobol et al. | 455/436 |
| 6,381,232 | B1 * | 4/2002 | Strawczynski et al. | 370/333 |
| 6,393,273 | B1 * | 5/2002 | Anderson et al. | 455/414.1 |
| 6,507,567 | B1 * | 1/2003 | Willars | 370/321 |
| 6,615,269 | B1 * | 9/2003 | Suumaki et al. | 709/230 |
| 6,799,039 | B2 * | 9/2004 | Wu et al. | 455/436 |
| 6,804,532 | B1 * | 10/2004 | Moon et al. | 455/552.1 |
| 6,888,803 | B1 * | 5/2005 | Gentry et al. | 370/259 |
| 6,901,257 | B2 * | 5/2005 | Kubota | 455/439 |
| 6,907,005 | B1 * | 6/2005 | Dahlman et al. | 370/236 |
| 7,012,905 | B2 * | 3/2006 | Haumont et al. | 370/331 |
| 7,016,321 | B1 * | 3/2006 | Park et al. | 370/331 |
| 7,088,701 | B1 * | 8/2006 | Attar et al. | 370/347 |
| 7,099,289 | B2 * | 8/2006 | Varma | 370/278 |
| 7,242,933 | B1 * | 7/2007 | Ahmavaara | 455/436 |
| 2001/0012279 | A1 * | 8/2001 | Haumont et al. | 370/331 |
| 2002/0080719 | A1 * | 6/2002 | Parkvall et al. | 370/235 |
| 2002/0094810 | A1 * | 7/2002 | Hassan | 455/424 |
| 2002/0126637 | A1 * | 9/2002 | Refai et al. | 370/331 |
| 2005/0094667 | A1 * | 5/2005 | Dahlman et al. | 370/473 |
| 2005/0237994 | A1 * | 10/2005 | Fong et al. | 370/349 |
| 2006/0083184 | A1 * | 4/2006 | Haumont et al. | 370/278 |
| 2007/0270100 | A1 * | 11/2007 | Agrawal et al. | 455/67.11 |

FOREIGN PATENT DOCUMENTS

| | | | |
|---|---|---|---|
| GB | 2361392 | | 10/2001 |
| GB | 2 369 003 | | 5/2002 |
| WO | 99/51051 | | 10/1999 |
| WO | WO 00/05909 | * | 2/2000 |
| WO | WO 01/05121 | | 1/2001 |
| WO | 01/20938 | | 3/2001 |

* cited by examiner

METHOD, SYSTEM AND EQUIPMENT FOR RETRANSMISSION IN COMMUNICATIONS SYSTEMS

This application is the US national phase of international application PCT/SE02/00231 filed 08 Feb. 2002, which designated the US.

TECHNICAL

The present invention relates to retransmissions in a communications system, and more especially it relates to a cellular mobile radio system, particularly to a Universal Mobile Telecommunications System, UMTS.

BACKGROUND

Retransmission of data to or from a mobile station, MS, or user equipment, UE, is previously known. It is also known to use a radio link control layer of a UMTS protocol structure in an acknowledged mode for dedicated channels.

In acknowledged mode, retransmissions are undertaken in case of detected transmission errors not recovered by forward error control. This is also called automatic repeat request, ARQ. With ARQ, retransmissions can be undertaken unless a transmitted message is (positively) acknowledged or if it is negatively acknowledged. Generally there are time limits for the respective positive and negative acknowledgements to be considered.

Within this patent application, a radio network controller, RNC, is understood as a network element including a radio resource controller. Node B is a logical node responsible for radio transmission/reception in one or more cells to/from User Equipment. A base station, BS, is a physical entity representing Node B.

Radio link control, RLC, is used within radio communications systems like General Packet Radio Services, GPRS, and UMTS.

International Patent Application WO0105121 describes a technique for providing a secure link in a mobile communication system including mechanisms for hard handover of a link in acknowledged mode. Data is tunneled.

A channel dedicated to a specific UE is referred to as a Dedicated Channel, DCH. A channel that is not a dedicated channel is called a common or shared channel.

UK patent application GB no. 0027148.6, describes channel switching between dedicated and common channels.

3$^{rd}$ Generation Partnership Project (3GPP): *Technical Specification Group Radio Access Network, Physical Layer Procedures*, 3G TS 25.301 v3.6.0, France, September 2000, specifies in chapter 5 Radio Interface Protocol Architecture of a UMTS system. There are three protocol layers:

physical layer, layer 1 or L1,
data link layer, layer 2 or L2, and
network layer, layer 3 or L3.

Layer 2, L2, and layer 3, L3 are divided into Control and User Planes. Layer 2 consists of two sub-layers, RLC and MAC, for the Control Plane and 4 sub-layers, BMC, PDCP, RLC and MAC, for the User Plane. The acronyms BMC, PDCP, RLC and MAC denote Broadcast/Multicast Control, Packet Data Convergence Protocol, Radio Link Control and Medium Access Control respectively.

FIG. 1 illustrates a simplified UMTS layers 1 and 2 protocol structure for the so called Uu Stratum, UuS, or Radio Stratum, between a user equipment UE and a Universal Terrestrial Radio Access Network, UTRAN.

Radio Access Bearers, RABs, make available radio resources (and services) to user applications. For each mobile station there may be one or several RABs. Data flows (in the form of segments) from the RABs are passed to respective Radio Link Control, RLC, entities which amongst other tasks buffer the received data segments. There is one RLC entity for each RAB. In the RLC layer, RABs are mapped onto respective logical channels. A Medium Access Control, MAC, entity receives data transmitted in the logical channels and further maps logical channels onto a set of transport channels. One transport channel is Downlink Shared Channel, DSCH.

Transport channels are finally mapped to a single physical transport channel which has a total bandwidth allocated to it by the network. In frequency division duplex mode, a physical channel is defined by code, frequency and, in the uplink, relative phase (I/Q). In time division duplex mode a physical channel is defined by code, frequency, and time-slot. The DSCH, e.g., is mapped onto one or several physical channels such that a specified part of the downlink resources is employed.

PDCP provides mapping between Network PDUs (Protocol Data Units) of a network protocol, e.g. the Internet protocol, to an RLC entity. PDCP compresses and decompresses redundant Network PDU control information (header compression and decompression).

For transmissions on point-to-multipoint logical channels, BMC stores at UTRAN side Broadcast messages received from an RNC, calculates the required transmission rate and requests for the appropriate channel resources. It receives scheduling information from the RNC, and generates schedule messages. For transmission the messages are mapped on a point-to-multipoint logical channel. At the UE side, BMC evaluates the schedule messages and deliver Broadcast Messages to upper layer in the UE.

3G TS 25.301 also describes protocol termination, i.e. in which node of the UTRAN the radio interface protocols are terminated, or equivalently, where within UTRAN the respective protocol services are accessible. Section 5.6.5 describes protocol termination for DSCH. The RLC protocol for DSCH is terminated in Serving Radio Network Controller, SRNC, for both the control and user planes.

3$^{rd}$ Generation Partnership Project (3GPP): *Technical Specification Group Radio Access Network, Physical Layer Procedures*, 3G TS 25.322 v3.5.0, France, December 2000, specifies the RLC protocol. The RLC layer provides three services to the higher layers:

transparent data transfer service,
unacknowledged data transfer service, and
acknowledged data transfer Service Subsections 4.2.1.1 and 4.2.1.2 describe transparent mode entities and unacknowledged mode entities. Basically, RLC differences of the two modes reside in management of packet overhead. In transparent mode no overhead is added or removed by RLC. In subsection 4.2.1.3 an acknowledged mode entity, AM-entity, is described (see FIG. 4.4 of the 3GPP Technical Specification). In acknowledged mode automatic repeat request, ARQ, is used. The RLC sub-layer provides ARQ functionality closely coupled with the radio transmission technique used. The three modes Transparent Mode, TM,
Unacknowledged Mode, UM, and
Acknowledged Mode, AM are hereinafter collectively referred to as RLC modes.

None of the cited documents above discloses a dynamic RLC configuration and termination point.

SUMMARY

In accordance with 3G TS 25.301, no macrodiversity is applied for DSCH, i.e., a specific DSCH is transmitted in a single cell only. As described above, the RLC protocol, and correspondingly the ARQ, is terminated in the serving RNC (SRNC). However, when the DSCH is transmitted in only a single cell at a time, the retransmission delay would reduce considerably if retransmissions were terminated in the BS, as the round trip delay would be decreased.

When a UE is distant to a base station, retransmission requests are likely to be transmitted to one or more base stations that did not transmit data at first instance. Retransmission will then involve transmissions between the two or more BSes and involve an RNC, nullifying the advantage of a termination point located in the BS, and potentially increasing retransmission delay.

Further, when a user equipment, like UE 1 in FIG. 2, is not involved in soft handover, it is advantageous in terms of time delay to have retransmissions terminated in BS 1/Node B 1, whereas when it is involved in soft handover it is advantageous to have the termination point located at an RNC.

Consequently, an object is to achieve a method and system of fast retransmissions to a UE near a BS and allowing for robust retransmissions using soft handover when necessary.

It is also an object to present an adaptive relocation of transmitting point.

These objects are met by dynamically switching between RLC configurations depending on radio conditions and UE locations. The RLC configuration and the location of transmitting point are adapted to UE location, number of transmitters and PDU size. Relocation is preferably achieved by means of RLC tunneling.

Preferred embodiments, by way of examples, are described with reference to the accompanying drawings below.

DETAILED DESCRIPTION

Figure 3:
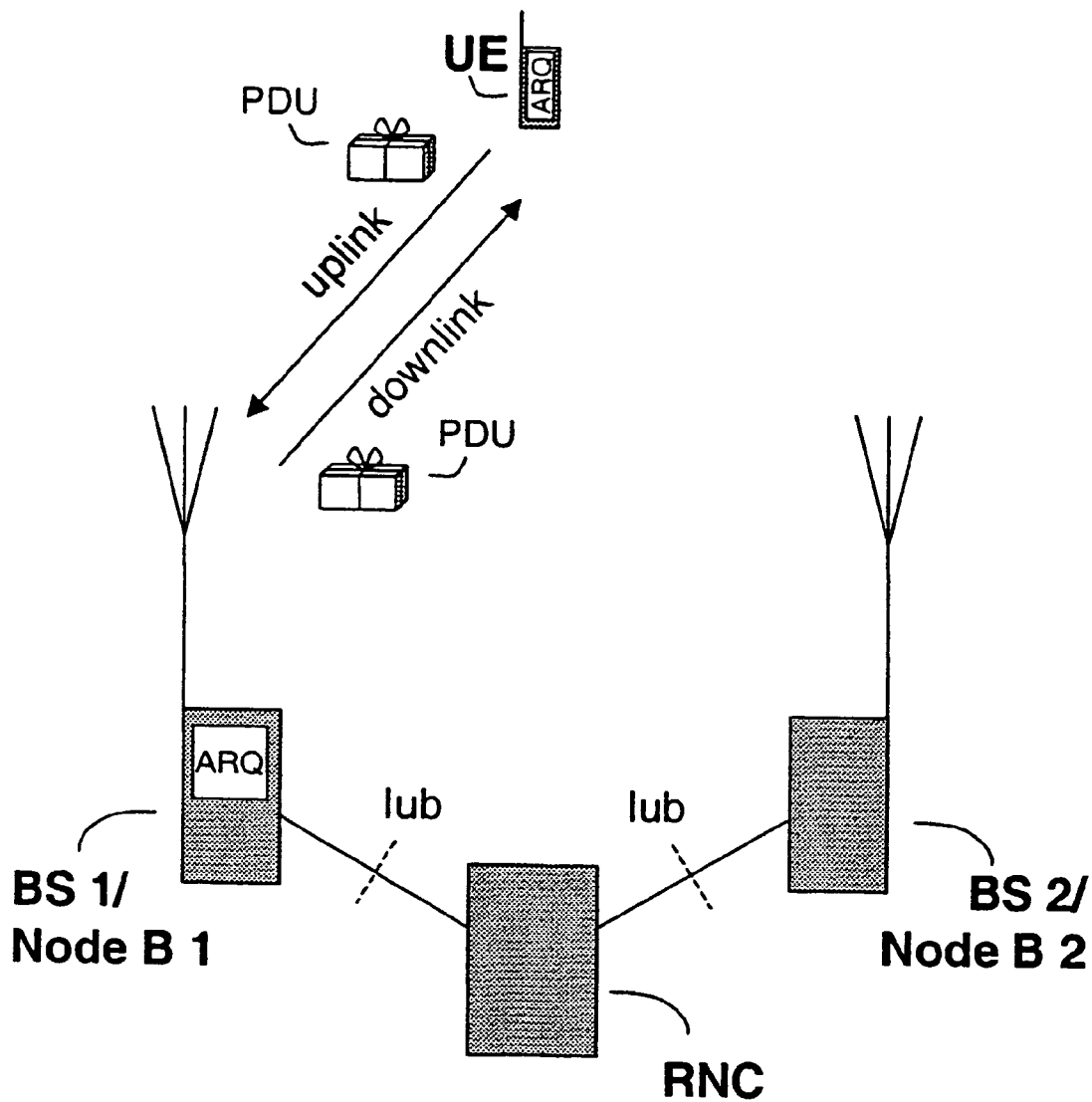
FIG. 3 shows communication with ARQ terminated in Node B between a UE and a base station involved in a connection between RNC and the UE.

With reference to FIG. 3, Node B 1 and Node B 2 are logical nodes responsible for radio transmission/reception in one or more cells to/from the User Equipment UE. BS 1 and BS 2 are physical entities representing Node B 1 and Node B 2 respectively. Node B 1 and Node B 2 terminate the air interface, called Uu interface within UMTS, between UE and respective Node B towards the radio network controller RNC. In UMTS the interface between a Node B and an RNC is called Iub interface.

In an exemplary situation UE communicates over a radio link associated with BS 1. Packet switched data is transmitted in protocol data units, PDUs, in both directions. If a protocol data unit PDU is received in error and the error is not recovered by forward error correction, the PDU is retransmitted.

In accordance with 3G TS 25.301, no macrodiversity is applied for DSCH, i.e., a specific DSCH is transmitted in a single cell only. As described above the RLC protocol, and correspondingly the ARQ, is terminated in the RNC. However, when the DSCH is transmitted in only a single cell at a time, the retransmission delay is reduced considerably by terminating retransmissions in BS 1 or Node B 1 in place of the RNC as the round trip delay is thereby decreased.

An ARQ-machine is a physical entity from which retransmissions are initiated. In FIG. 3 there is an ARQ-machine ARQ in each of Node B 1 and UE.

Figure 1:
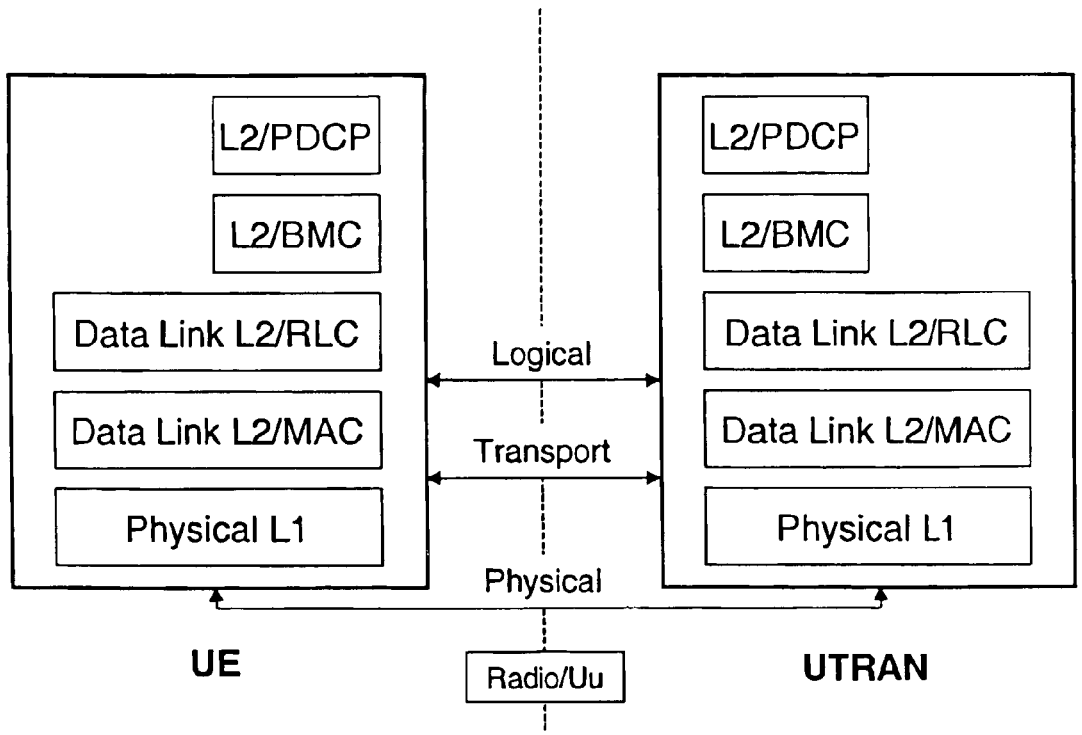
FIG. 1 displays a layered protocol structure in a radio communications system.
Figure 2:
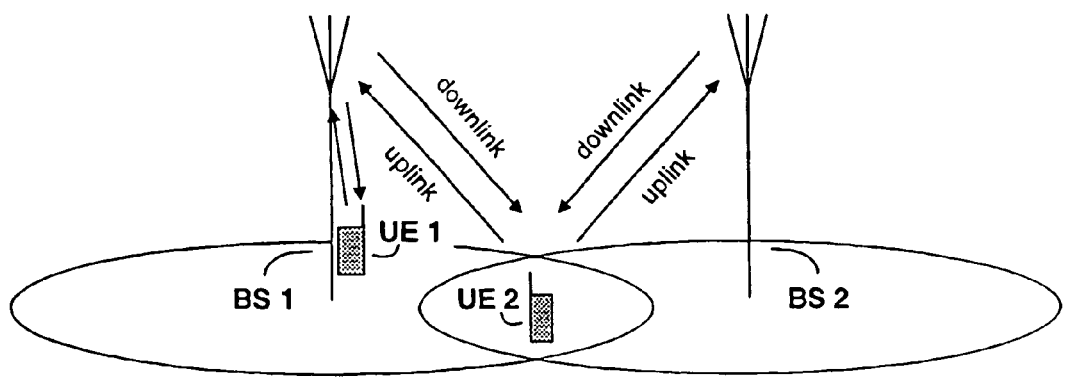
FIG. 2 schematically illustrates a user equipment communicating with one or two base stations.

With reference to FIG. 2, user equipment UE 1 being close to a base station BS 1 will in general not be involved in soft handover. A user equipment more distant to BS 1, like user equipment UE 2, is likely to communicate over radio links associated with more than one BS, BS 1 and BS 2. In this figure the BSes are indicated to operate omnidirectionally. However, the technology is not limited to omnidirectional base stations. It can readily be used irrespective of whether the base stations use directional or omnidirectional antenna radiation patterns.

Excessive retransmissions reduce throughput and system performance. Soft handover can reduce the amount of transmission errors not recovered.

Figure 4:
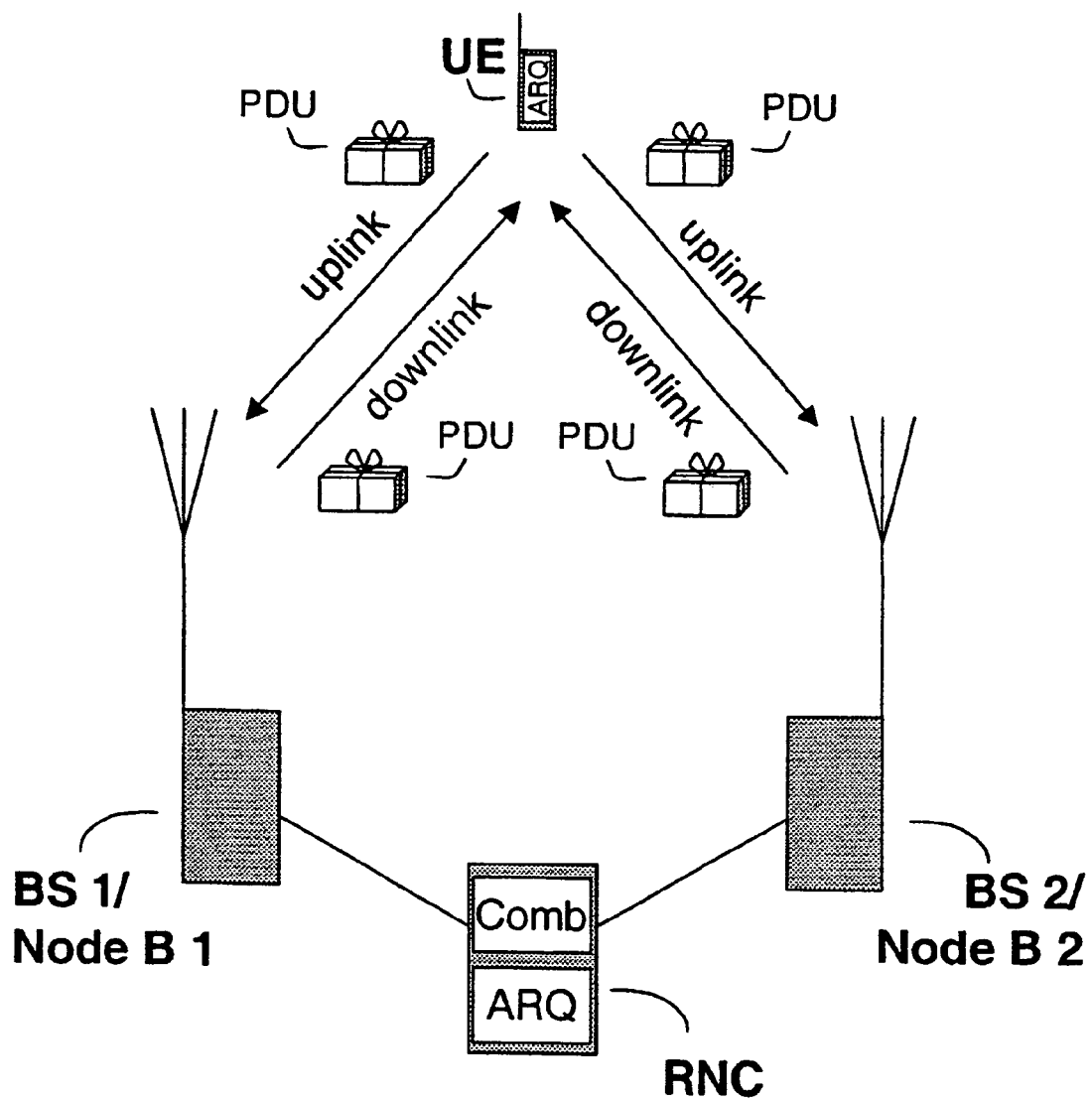
FIG. 4 shows communication with ARQ terminated in RNC between a UE and two base stations involved in a connection between RNC and the UE.

In FIG. 4, user equipment UE is involved in soft handover for at least one link direction (up or down). A macrodiversity or soft handover combiner for the uplink direction Comb is located at the RNC, see FIG. 4. When soft handover is used also in downlink direction a corresponding combiner in user equipment UE is utilized. Depending on the outcome of the macrodiversity combining, there may be no need for retransmission. Further, when a UE is distant to a base station, retransmission requests are likely to be transmitted to one or more base stations that did not transmit data at first instance. Retransmission will then involve transmissions between two or more base stations/Nodes B and involve an RNC, nullifying the advantage of a termination point located in Node B, and potentially increasing retransmission delay. In FIG. 4 the ARQ-machine ARQ is located in RNC and UE respectively.

Consequently, when user equipment UE is not involved in soft handover, it is advantageous in terms of time delay to have retransmissions terminated in a Node B, Node B 1, see FIG. 3. When it is involved in soft handover with radio links associated with two or more Nodes B, Node B 1 and Node B 2, it is advantageous to have the termination point located at radio network controller RNC, see FIG. 4.

Thus, an ARQ machine, not being fixed to one geographical location, is introduced which can be dynamically relocated between a Node B and an RNC as need be to achieve a sufficiently small retransmission delay. Four example alternatives of relocation of an ARQ-machine are considered:

1. Protocol State Transfer,
2. Multiple ARQ Protocols,
3. Service Data Unit Transfer, and
4. RLC Tunneling.

Figure 5:
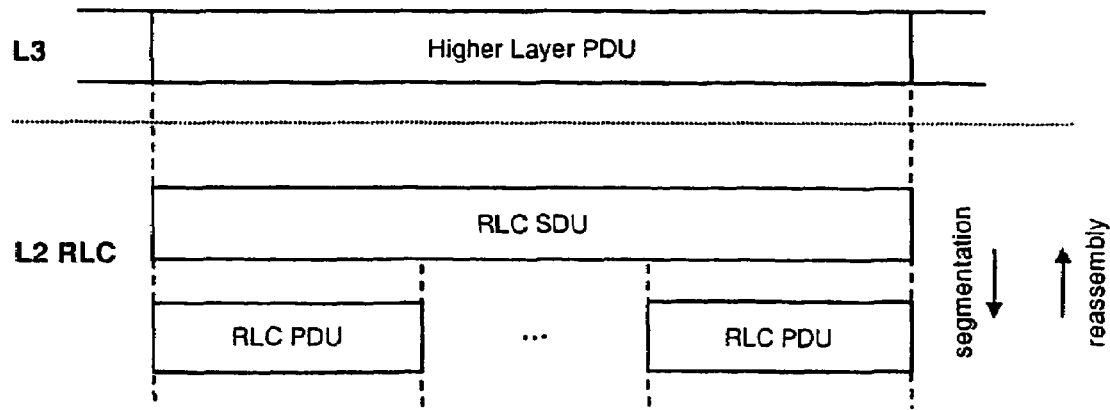
FIG. 5 schematically illustrates two protocol layers from a multilayer protocol.

A network layer PDU or L3 PDU can comprise several RLC PDUs, as illustrated in FIG. 5. RLC PDUs are reassembled into service data units, SDU, prior to delivery to higher layer PDU. The L3 protocol can be, e.g., the Internet Protocol, IP. Upon reception from L3, SDUs are segmented into RLC PDUs.

Protocol State Transfer moves/transfers the whole protocol state, including state variables and buffers to the new network node.

With Multiple ARQ Protocols, data is secured by having two or more levels of ARQ protocols. One protocol level is run between UE and Node B, another protocol level is run between UE and RNC. Upon relocation, no particular measures need to be undertaken for PDUs in the old ARQ machine, as a potential loss of data is recovered by higher level ARQ protocols.

In Service Data Unit transfer, SDUs are buffered until all RLC PDUs carrying an SDU are successfully transmitted. Upon relocation, all stored (complete) SDUs are moved from the old ARQ-machine to the new ARQ machine. The SDUs are segmented into RLC PDUs and transmitted at the new ARQ-machine.

Finally, using RLC tunneling for relocation of an ARQ-machine there will be two RLC protocols considered: the old/existing RLC protocol and a new RLC protocol at the new location. One or more RLC PDUs buffered but not yet successfully transmitted to the destination from the old RLC protocol are tunneled through the new RLC protocol. The old RLC protocol does not perform the ARQ function of the tunneled RLC PDUs. In reverse direction, the old RLC protocol assembles old RLC PDUs provided by the new RLC protocol until a SDU or L3 PDU, only partially completed at the time of relocation, is completed. Subsequent SDUs or L3 PDUs will be assembled at the new RLC protocol. In UMTS the ARQ protocols are RLC protocols. This technology also applies if other than the RLC protocol is used for ARQ.

RLC tunneling also enables RLC reconfiguration in the new retransmission point. This is important as performance can be improved in the new location by a change of e.g. PDU size.

In one example embodiment, two or more of the basic alternatives for relocation are implemented. However, only one alternative is on at a time the other alternatives being switched off.

Figure 6:
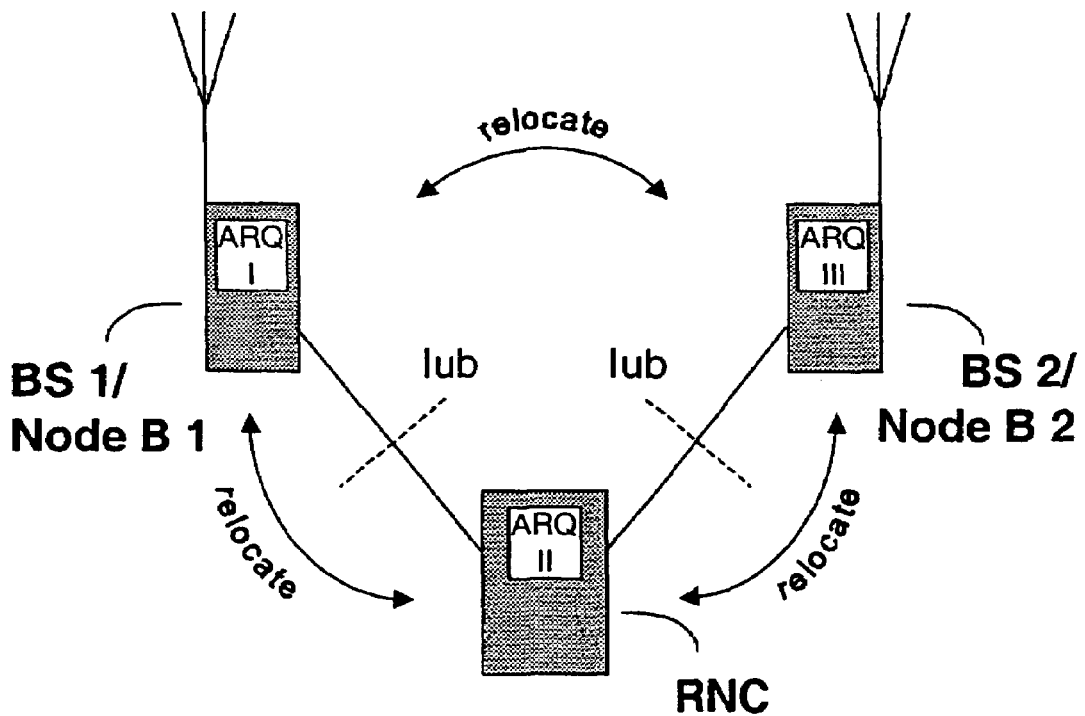
FIG. 6 illustrates the principle of RLC relocation.

FIG. 6 illustrates how an ARQ-machine is dynamically relocated. When a UE is close to base station BS 1, the ARQ machine of the UTRAN-side is located in BS 1. As the UE approaches BS 2 a link associated with BS 2 will be established for soft handover. The UTRAN-side ARQ-machine will then be relocated from ARQ I in Node B 1 to ARQ II in RNC. If the UE moves further towards base station BS 2 the link associated with BS 1 will be released and the ARQ machine relocated from ARQ II in RNC to ARQ III in Node B 1. If only hard handover is used, the ARQ machine is preferably located in the base stations. Then, relocation of the ARQ-machine is from ARQ I in Node B 1 to ARQ III in Node B 2. In FIG. 6 the UE-side ARQ-machine is never relocated. However, due to reconfigurations of the ARQ-machine at UTRAN-side, it can be reconfigured accordingly.

Figure 7:
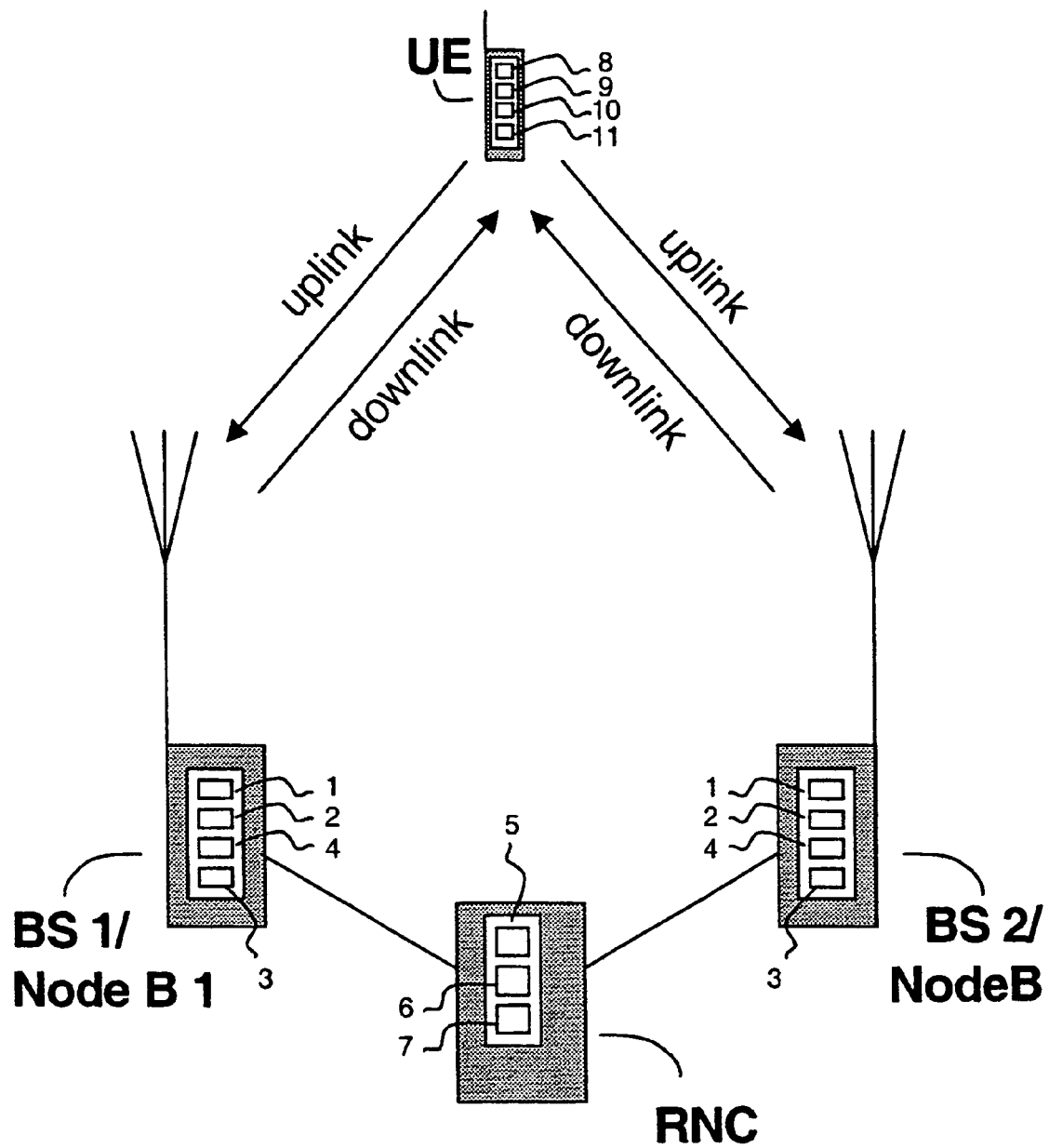

FIG. 7 shows two base stations BS 1 and BS 2 and an RNC. Initially only BS 1 is communicating with the user equipment UE. The base stations comprise means 1 for reconfiguring a link layer protocol and means 2 for determining one or more communication parameters, such as number of active links, propagation path loss, signal to noise ratio, signal to interference ratio, propagation time. The one or more parameters are determined in relation to user equipment UE, involving means 8-10 for transmission of transmitted and received signal strength, signal timing and interference level respectively used in the process of determining the communication parameters. BS 1 and BS 2 also comprise means 3 for changing PDU size. As PDUs are communicated to and from user equipment UE it has corresponding means 11. Means 5 and 6 of RNC correspond to means 1 and 2 of the base stations since both a base station and an RNC are legitimate RLC termination points. Means 4 of BS 1 and BS 2 and means 7 of RNC represent means for transferring a protocol termination point by RLC tunneling, Service Data Unit Transfer, Multiple ARQ protocols or Protocol State Transfer.

A person skilled in the art readily understands that the receiver and transmitter properties of a BS or a UE are general in nature. The use of concepts such as BS, UE or RNC within this patent application is not intended to limit the technology to devices associated with these acronyms. It concerns all devices operating correspondingly, or adaptable thereto by a person skilled in the art. Explicit non-exclusive examples include mobile stations without a subscriber identity module, SIM, as well as user equipment including one or more SIMs. Further, protocols and layers are referred to in close relation with UMTS terminology. However, this does not exclude applicability of the technology in other systems such as GPRS or with other protocols and layers of similar functionality.

The invention is not intended to be limited only to the example embodiments described in detail above. Changes and modifications may be made without departing from the invention. All modifications within the scope of the following claims are covered.

The invention claimed is:

1. A method of dynamically switching a termination point of an ARQ link layer protocol in a communications system, the method comprising:
    determining one or more parameters related to a user equipment,
    dynamically reconfiguring an ARQ link layer protocol residing in the radio network element in a communications system for a communication with the user equipment,
    connecting a network ARQ protocol termination point and a user equipment for the communication with the user equipment, and
    dynamically switching the network ARQ protocol termination point for the communication with the user equipment during the connection from a first network element at a first hierarchical level of the radio network to a second different network element at a second different hierarchical level of the radio network depending on the one or more parameters related to the user equipment,
    wherein the determined one or more parameters includes a number of active links simultaneously involved in a specific communication service for the user equipment.

2. The method according to claim 1, wherein one of the first and second network elements is responsible for radio transmission/reception.

3. The method according to claim 1, wherein one of the one or more parameters is the geographical distance between the first network element and the user equipment.

4. The method according to claim 1, wherein one of the one or more parameters is the electrical distance between the first network element and the user equipment in terms of at least one of
    signal propagation path loss,
    signal to noise ratio,
    signal to interference ratio, and
    signal propagation time.

5. The method according to claim 1, wherein the link layer is reconfigured as the termination point is switched.

6. The method according to claim 1, wherein the link layer is layer 2 radio link control layer.

7. The method according to claim 1, wherein the location of the ARQ protocol termination point is changed by any one of: RLC tunneling, Service Data Unit Transfer, Multiple ARQ Protocols, and Protocol State Transfer.

8. The method according to claim 1, wherein the link layer is reconfigured by changing at least one of:
size of packet data units or service data units,
ARQ discipline, such as no ARQ, Stop and wait ARQ, Go-Back-N ARQ,
Selective Repeat ARQ and ARQ using positive or negative acknowledgements,
RLC mode,
acknowledgement timing,
tunneling state,
tunneling destination.

9. The method according to claim 1, wherein the communications system is a cellular mobile radio system.

10. A radio network element comprising:
means for determining one or more parameters related to a user equipment,
means for dynamically reconfiguring an ARQ link layer protocol residing in the radio network element in a communications system for a communication with the user equipment,
means for connecting a network ARQ protocol termination point and a user equipment for the communication with the user equipment, and
means for dynamically switching the network ARQ protocol termination point for the communication with the user equipment during the connection from a first network element at a first hierarchical level of the radio network to a second different network element at a second different hierarchical level of the radio network depending on the one or more parameters related to the user equipments,
means for determining the one or more parameters including a number of active radio links simultaneously involved in serving the communication service with the user equipment.

11. The network element according to claim 10, wherein one of the one or more parameters is the geographical distance between the first network element and the user equipment.

12. The network element according to claim 10, wherein one of the one or more parameters is the electrical distance between the first network element and the user equipment in terms of at least one of:
signal propagation path loss,
signal to noise ratio,
signal to interference ratio, and
signal propagation time.

13. The network element according to claim 10, further comprising: means for reconfiguration of the link layer upon switching of the network protocol termination point.

14. The network element according to claim 10, wherein the link layer is a layer 2 radio link control layer.

15. The network element according to claim 10, further comprising means for transferring a protocol termination point by RLC tunneling, Service Data Unit Transfer, using Multiple ARQ Protocols or Protocol State Transfer.

16. The radio network element according to claim 10, wherein the first radio network element is a base station and the second radio network element is a radio network controller coupled to multiple base stations.

17. The radio network element according to claim 10, wherein the first radio network element is a radio network controller coupled to multiple base stations and the second radio network element is a base station.

18. User equipment comprising:
an ARQ protocol entity residing in the user equipment for establishing a link layer protocol connection for a communication between the user equipment and an ARQ protocol termination point located in a radio base station; and
a controller, based on one or more parameters associated with the user equipment or the ARQ protocol termination point, for reconfiguring, during the communication, the link layer protocol connection with the ARQ protocol termination point for the communication when the ARQ protocol termination point is relocated during the communication from the radio base station to a radio network controller associated with the radio base station,
wherein the one or more parameters includes a number of active links simultaneously involved in a specific communication service for the user equipment.

19. The user equipment according to claim 18, wherein the one or more parameters includes one or more of:
geographical distance between the first network element and the user equipment, and
electrical distance between the first network element and the user equipment in terms of at least one of:
signal propagation path loss,
signal to noise ratio,
signal to interference ratio, and
signal propagation time.

20. The method in claim 1, further comprising: initially locating the ARQ protocol termination point for the connection in the radio base station, and relocating the ARQ protocol termination point in the base station controller when the connection is in soft handover.

21. The method in claim 20, further comprising: switching the ARQ protocol termination point from the base station controller to a third network element corresponding to another radio base station.

22. A radio access network comprising:
a radio base station for establishing a communication with a user equipment and having an ARQ protocol termination point for establishing a link layer protocol connection with an ARQ protocol entity located in the user equipment, and
a radio network controller for controlling multiple radio base stations and, based on one or more parameters associated with the user equipment or the ARQ protocol termination point, for reconfiguring the link layer protocol connection so that the ARQ protocol termination point for the communication is moved from the radio base station to the radio network controller,
wherein the one or more parameters includes a number of active links simultaneously involved in a specific communication service for the user equipment.

23. The radio access network according to claim 22, wherein the one or more parameters includes one or more of:
a geographical distance between the first network element and the user equipment, and
an electrical distance between the first network element and the user equipment in terms of at least one of:
signal propagation path loss,
signal to noise ratio,
signal to interference ratio, and
signal propagation time.

* * * * *